(No Model.) 5 Sheets—Sheet 2.
B. J. ARNOLD.
ELECTRIC POWER APPLIANCE.
No. 517,831. Patented Apr. 10, 1894.
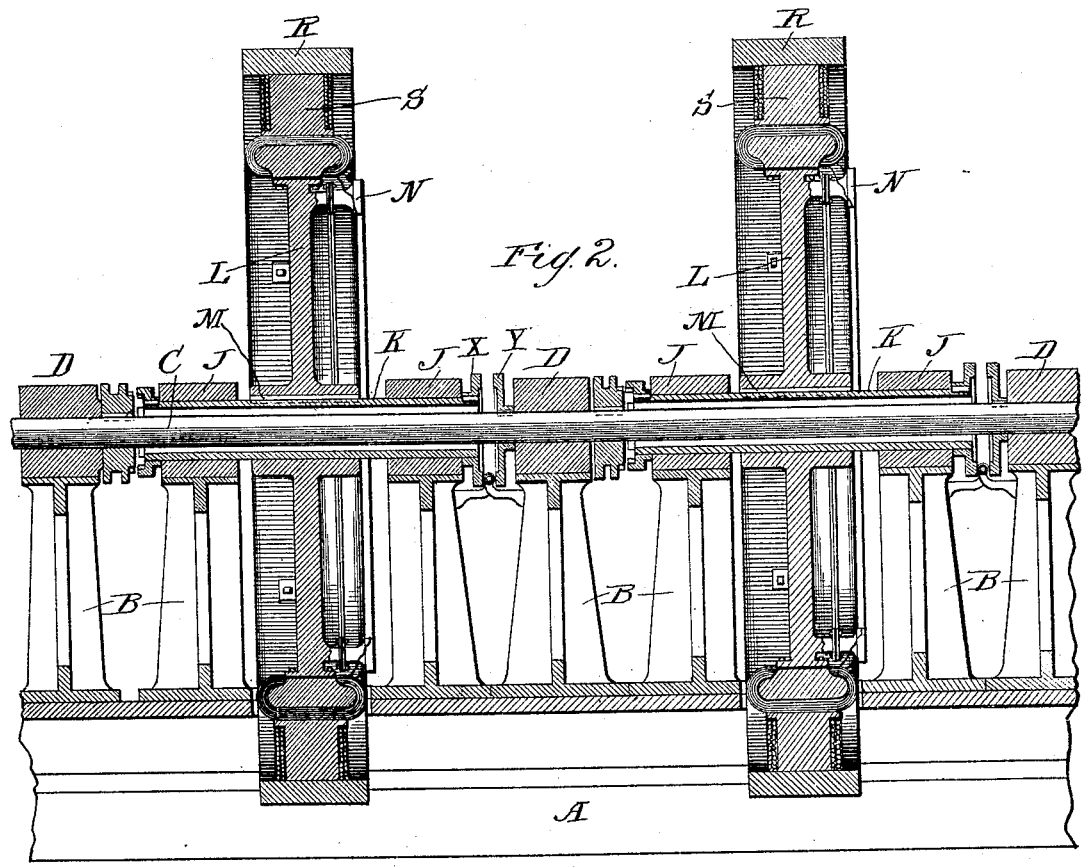
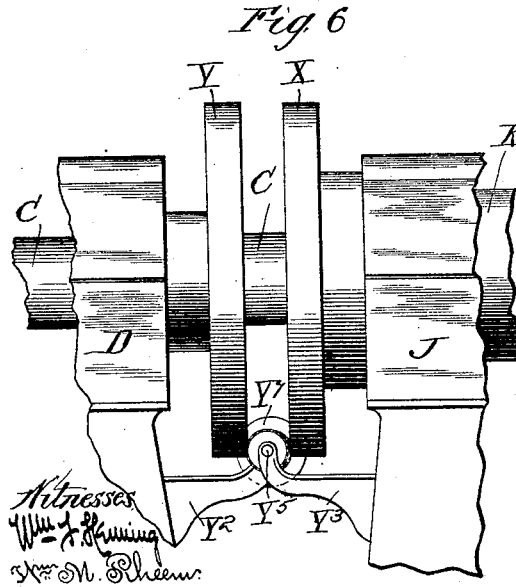
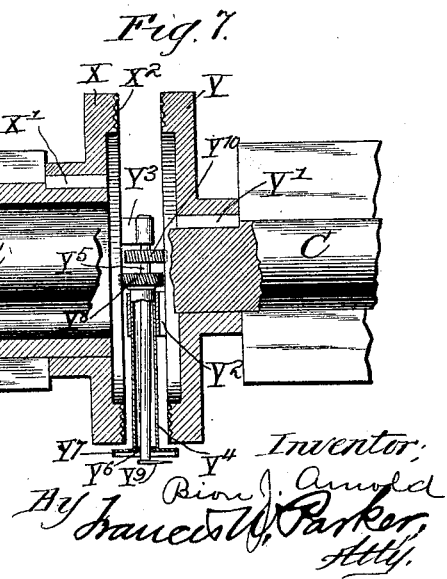

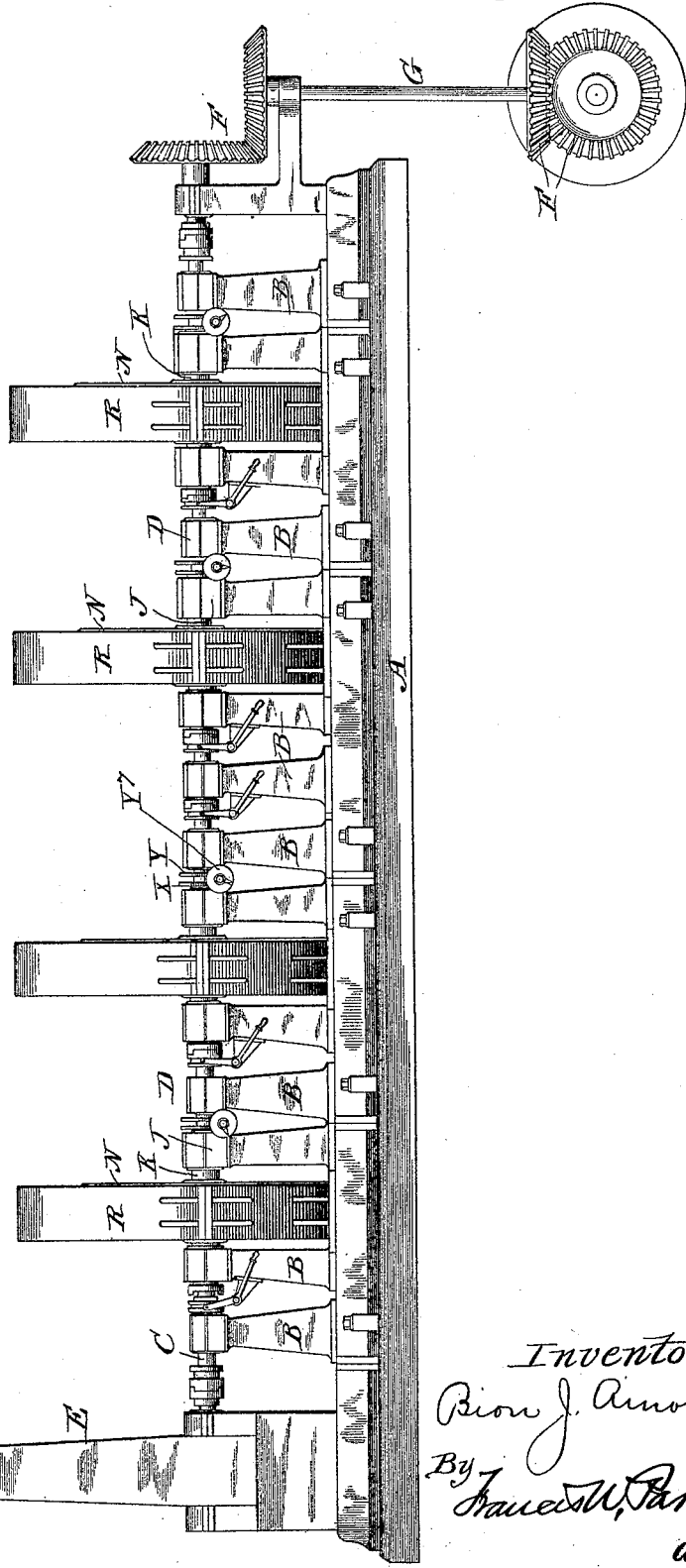

(No Model.)  5 Sheets—Sheet 3.
B. J. ARNOLD.
ELECTRIC POWER APPLIANCE.
No. 517,831.  Patented Apr. 10, 1894.
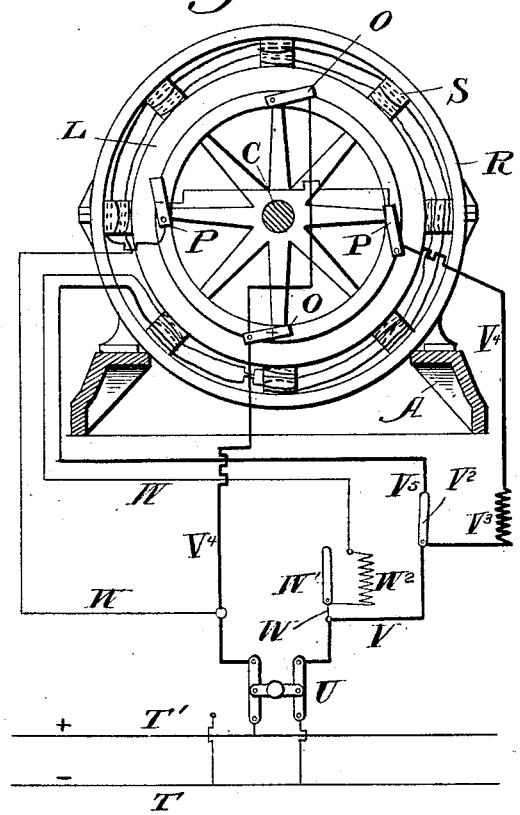
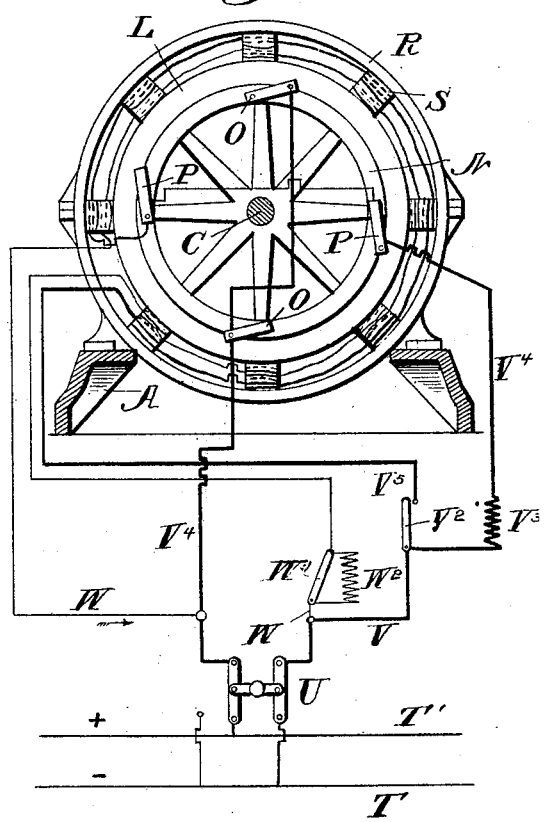
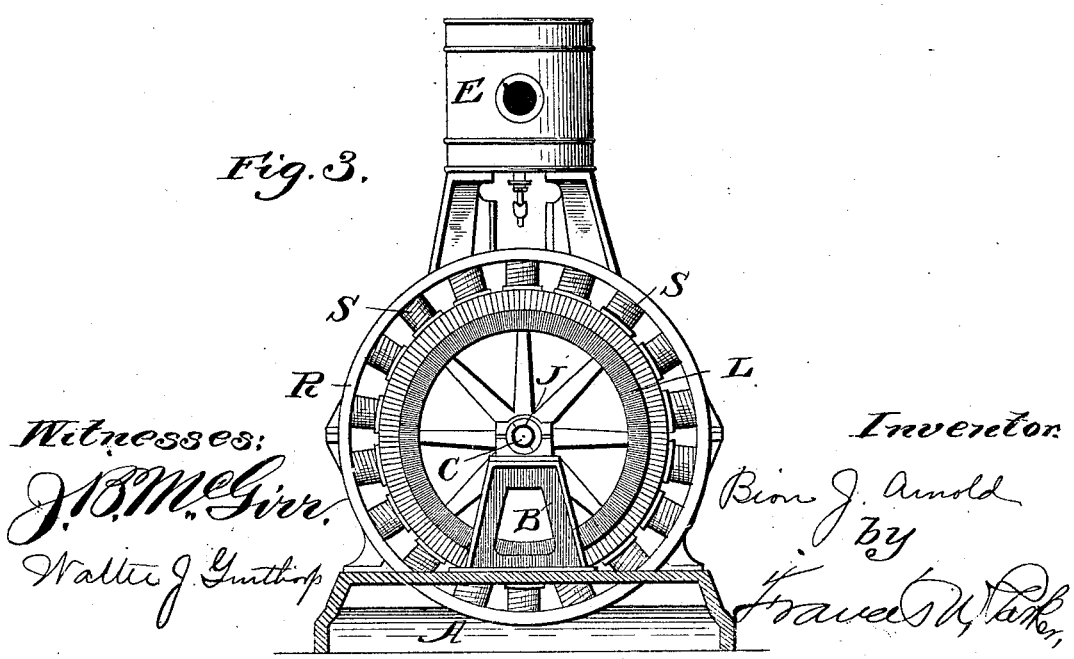
Witnesses:  Inventor
Bion J. Arnold (No Model.)
B. J. ARNOLD.
ELECTRIC POWER APPLIANCE.
No. 517,831. Patented Apr. 10, 1894.
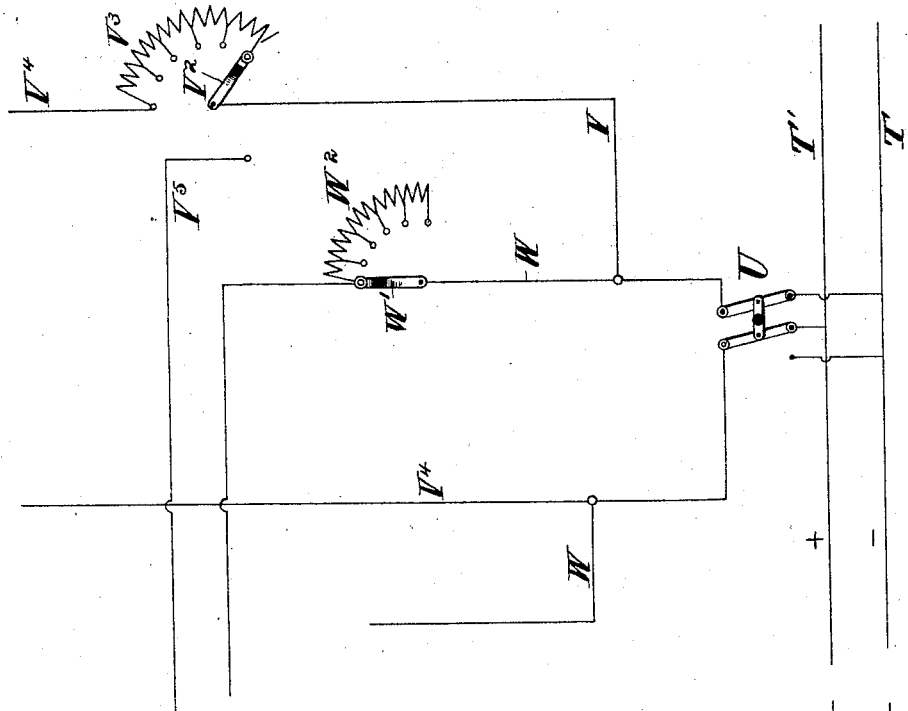
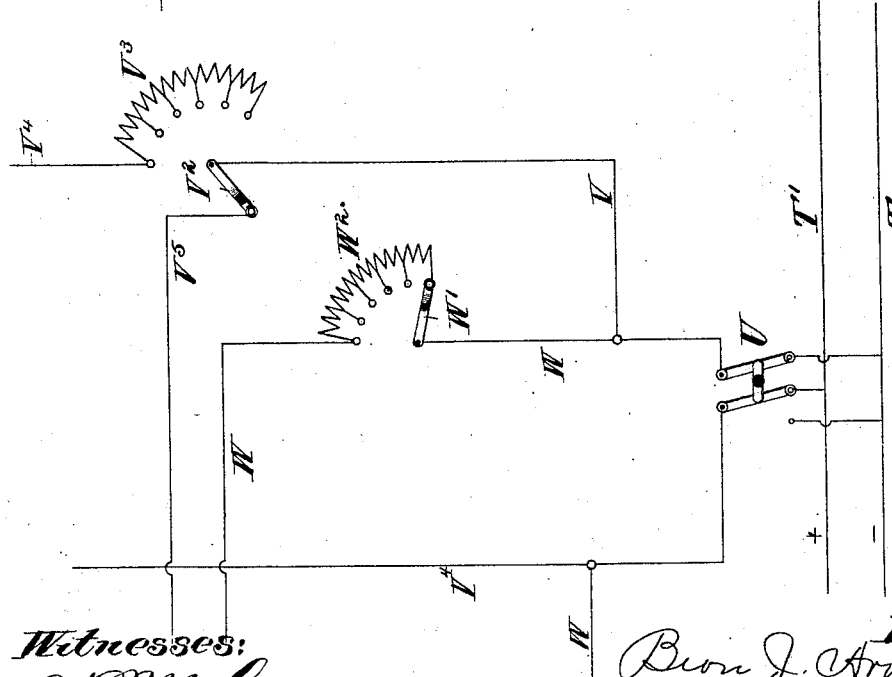

(No Model.) 5 Sheets—Sheet 5.
B. J. ARNOLD.
ELECTRIC POWER APPLIANCE.
No. 517,831. Patented Apr. 10, 1894.
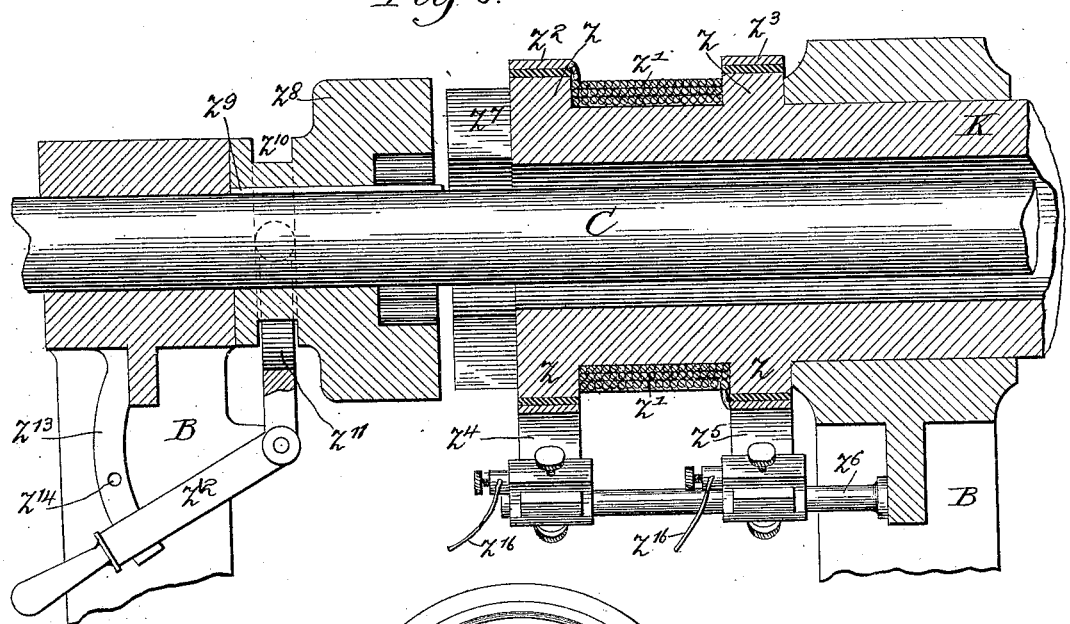
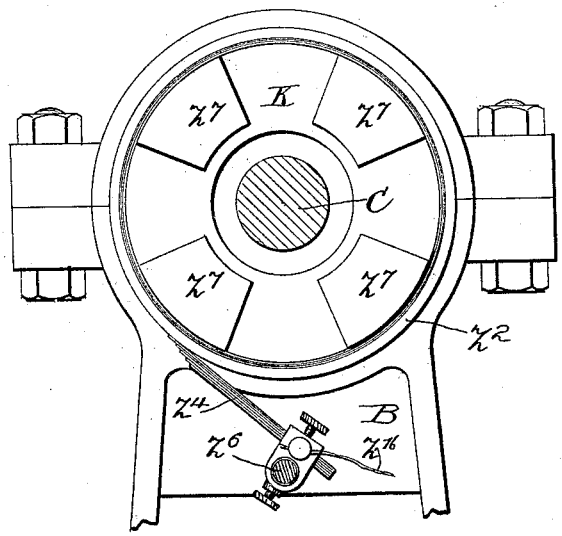
Witnesses
Wm. F. Hemming
Thos. M. Rheem
Inventor
Bion J. Arnold
by Francis W. Parker,
Attorney
THE NATIONAL LITHOGRAPHING COMPANY,
WASHINGTON, D. C.

UNITED STATES PATENT OFFICE.

BION J. ARNOLD, OF CHICAGO, ILLINOIS.

ELECTRIC-POWER APPLIANCE.

SPECIFICATION forming part of Letters Patent No. 517,831, dated April 10, 1894.

Application filed August 31, 1892. Serial No. 444,607. (No model.)

*To all whom it may concern:*

Be it known that I, BION J. ARNOLD, a citizen of the United States, residing at Chicago, Cook county, Illinois, have invented a new and useful Improvement in Electric-Power Appliances, of which the following is a specification.

My invention relates to electric power appliances, and has for its object to provide means for a convenient and simple arrangement of a series of electric generators whereby either may be used as a generator or motor and either may be operated as a generator for the purpose of bringing the one operating as a motor to proper speed before coupling it to the driving shaft.

A further object of my invention is to provide suitable clutching and indicating mechanisms for conveniently connecting the movable portion of the generator to the shaft.

The further objects of my invention are to provide suitable and convenient means for accomplishing results as hereinafter set out.

My invention is illustrated in the accompanying drawings, wherein—

Figure 1, is an elevation of a series of dynamo electric machines, associated with a continuous shaft. Fig. 2, is a longitudinal vertical section through a portion of the same. Fig. 3, is a cross section through the same. Fig. 4, is a diagrammatic view of the dynamo electric machine connected to operate as a generator. Fig. 5, is a similar view of the machine connected to operate as a motor. Figs. 6 and 7, are detail views of the speed indicator. Figs. 8, 9, and 10, are detail views of the magnetic clutch.

Like parts are indicated by the same letter in all the figures.

A is a base or foundation upon which the generators are supported. B B are standards on such foundation to properly support the bearings for the parts.

C is the main line shaft supported in the bearings D D and adapted to be driven by any motor.

I have illustrated the shaft as driven directly from an engine E or by means of the gears F F and shaft G from some other source of power. About this shaft suitably journaled in boxes J J, supported on the standards B B are sleeve shafts K K, which are adapted to rotate about substantially the same axis as the shaft. Upon each of these sleeve shafts is secured the moving part of a dynamo electric machine, the same being the field magnet, the armature or other moving part, the motion of which is incident to the operation of such machine. In this case I have shown a moving armature L, supported on the shaft. This armature is keyed to the sleeve shaft so as to rotate therewith by the feather M. Each armature is provided with a laterally exposed ring-shaped commutator N. Exposed to this armature are the brushes O O P P.

R is a fixed field magnet with the inwardly projecting pole pieces S S.

T and T' are the main current conductors, the connection of which with the dynamo electric machine is illustrated in Figs. 4 and 5.

U is a double pole reversing switch, by which the machine may be either cut in or out of circuit of such main line wires or the current reversed through the main conductors.

V is a conductor leading from one portion of the switch respectively to the single pole switch $V^2$ and the variable resistance $V^3$. One branch of this conductor $V^4$ leads from the resistance to the brushes P P, thence through the armature to the brushes O O and thence to the other branch of the switch U, which connects with the conductor T'. The other branch of this conductor $V^5$ leaves the single pole switch $V^2$, traverses the field magnet and passes thence to the brushes P P. From that portion of the double pole switch U, which is connected with the conductor T leads also a conductor W to the single pole switch W', and the variable resistance $W^2$. This conductor W leads from the terminal of such resistance and switch through the field coils and back to the other branch of the double pole switch U which connects with the conductor T'.

At one end of each sleeve shaft there is preferably an indicating device whereby notice is given when the main shaft and the sleeve shaft are rotating independently, but at the same rate of speed, and at the other end of such sleeve shaft there is placed a clutch which may be used at such time to throw the two shafts into rigid connection. The indicator is illustrated especially in Figs. 2, 6, and 7.

X is a ring secured on the end of the sleeve shaft by the feather X', and provided with the gear cuttings or grooves $X^2$. Opposed to this grooved ring is a similar ring Y, secured by a feather Y' on the shaft C. Two arms $Y^2$ $Y^3$ project respectively from opposite standards.

$Y^2$ furnishes a long bearing for the tube $Y^4$, while $Y^3$ furnishes a bearing for the shaft $Y^5$, the other end of which has a bearing at $Y^6$ in the end of the tube $Y^4$. On one end of the tube is the preferably graduated or marked plate $Y^7$, and at the other the worm gear $Y^8$, and on one end of the shaft is the pointer $Y^9$, and on the other the worm gear $Y^{10}$. These worm gears each engage one of the rings X Y.

In Figs. 8, 9, and 10 is illustrated the magnetic clutch. On one end of each sleeve are formed the collars Z Z, between which are the coarse windings Z'. About these collars are ringed terminals $Z^2 Z^3$, opposed to the brushes $Z^4 Z^5$ on the laterally projecting rod $Z^6$, which is supported on one of the standards. Outwardly projecting pole pieces $Z^7 Z^7$ are formed or attached to the end of the sleeve shaft. Opposed to these pole pieces is a clutch-shaped armature $Z^8$, having portions adapted to interlock with the pole pieces, and keyed loosely on the shaft by the feather $Z^9$.

$Z^{10}$ is a groove about the inner end of the clutch piece to receive the pins on the yoke $Z^{11}$, which yoke is controlled by the handle $Z^{12}$.

$Z^{13}$ is an arc-shaped arm which passes through or along the handle and may have a stop pin $Z^{14}$.

$Z^{15}$ is a reversing switch with two permanent contacts at one side and conductors $Z^{16}$ leading thence to the brushes $Z^4 Z^5$, and three terminals at the other end and conductors leading thence to the main conductors T, T' or to any other source of electrical energy.

I do not, of course, desire to limit myself to the exact or precise construction or arrangement of the several parts and some features may be omitted without affecting the operation of the others.

The use and operation of my invention are as follows: It being desired to operate a series of dynamo electric machines on a single shaft driven by some continuously operating motor, it is important to so associate such machines as that either, any, or all can be used to supply current to the main conductors for use elsewhere. When the plant is started it may not be desirable to operate more than one dynamo; but after having so started one dynamo, it becomes important to have means whereby any other dynamo may be easily set into operation without interfering with the operation of the first. I have shown my means for accomplishing this result as illustrated in connection with compound wound machines. When the shaft is started in rotation, the dynamo or dynamos to be operated should be first brought into rigid relation with the shaft so that their rotating parts will be driven thereby. This is accomplished by moving the parts of the several clutches, either by hand or by electricity, if accessible for that purpose, so as to rigidly connect the shaft and such main part. The rotating shaft carrying such moving part will energize the dynamos and they will furnish current to the main conductors T, T'. After these dynamos have attained the usual high rate of speed, the other dynamos being at rest, if it becomes necessary to start any of the remaining machines, such machines so to be started may be operated as a motor until its moving part has attained an equal velocity of rotation with the driving shaft. Referring to Fig. 4, it will be observed that the machine is here supposed to be operated as a generator. The circuit is completed as follows: from the conductor T' through double pole reversing switch U, conductor $V^4$, brushes O O, armature L, brushes P P, field magnet coils S S, conductor $V^5$, switch $V^2$, and conductor V, switch U and back to the other main conductor T. In this position, all of the variable resistance $V^3$ will be in the circuit, and hence the current will have but little tendency to flow through. At the same time a shunt circuit is formed by the conductor W, leading from the switch U through the field coils to the variable resistance $W^2$, back to the other branch of the double pole switch. This machine is therefore supplying the main conductors with current. By disposing the parts as indicated in Fig. 5, the circuits will be varied, so that the circuit of conductor V includes at first the high variable resistance $V^3$, and excludes the series winding of the field magnet, and the shunt circuit excludes the resistance $W^2$, by means of switch W' so that a variable current may be made to pass through the armature by varying the resistance $V^3$. Thus this machine operates as a motor and its sleeve shaft is driven at any desired rate of speed by simply adjusting the resistance $V^3$. The rotation of the sleeve shaft will vary from the rotation of the main shaft. But as they are provided with opposed gear rings as indicated in Figs. 6 and 7, and as these rings are associated with worm gears, this variation in speed of rotation is indicated by the moving of the indicator finger $Y^9$, with regard to the indicating plate $Y^7$. When these two parts rotate together it will be evident that the main shaft and sleeve shaft are rotated together. The speed of rotation of the armature may be varied until the clutch is in the proper position for engagement. The clutch may now be operated to rigidly connect the two shafts together, and the switches may be changed to the arrangement indicated in Fig. 4, when this machine will also operate as a generator to supply current to the main conductors. The operation of the clutch is greatly facilitated by the employment of a magnetic clutch which may be easily actuated from the main current. When the switch $Z^{15}$ is set so as to supply current to the magnetic clutch, it will induce a certain polarity in the projecting pole pieces $Z^7$, depending upon the direction of the current through coil $Z'$. If switch $Z^{15}$ is thrown to the opposite from its present position, the current in coil $Z'$ will be reversed thereby reversing the polarity of $Z^7$.

$Z^8$ is a permanent magnet or polarized steel casting, which will be attracted or repelled by $Z^7$, depending upon the direction of the current through $Z'$. It is not desired, however, to limit $Z^8$ to being a permanent polarized magnet, but it may be necessary in practice to surround it with coils similar to $Z^7$, thus making it an electro-magnet. It will be noticed that by reversing the current through $Z'$ joined poles of $Z^7$ and $Z^8$ can be made to attract or repel each other at will, thus throwing the clutch in or out of gear at will of the operator. The hollow sleeve shaft or hollow sleeve is divided or split longitudinally as indicated in Fig. 3, and the rotating part of the dynamo, which in this instance is the armature, is in like manner shown as divided into two parts, though it might be divided into more if desired. The lugs or other devices to secure these parts together are not shown as applied to the hollow shaft, and various minor details are omitted from the sheets of drawings from time to time to avoid confusion.

Figs. 4ª and 5ª show the resistances $W^2$ and $V^3$ represented in Figs. 4 and 5 as being variable.

All resistance shown in the diagrams are supposed to be variable and in practice would be adjustable resistance boxes or rheostats.

I have described my invention as applied to continuous current machines, but do not wish to be limited to such, as my invention is equally applicable to multiphase and alternate current machines.

I claim—

1. The combination of a series of dynamo electric machines, with switches so that either can be connected with electrical conductors, as a motor or generator, a driving shaft, or equivalent, and a lock to connect the rotating part of the machine directly with the shaft when the two have attained equal speed, and a magnetic device to operate such lock.

2. A speed indicator for a dynamo electric machine, consisting of opposed gear rings, associated one with the driving shaft, the other with a moving part of the machine, and indicators proper actuated one from each ring.

3. As a speed indicator for a dynamo electric machine, two opposed gear rings, one associated with the driving shaft, the other with the moving part of the machine, two worm gears associated one with each of such rings, a tube driven by one gear and a shaft driven by the other gear and placed diagonally in the two, and indicators associated with the ends of the shaft and tube.

4. The combination of a series of dynamo electric machines, with a continuous driving shaft, a rotating part for each of said dynamos mounted upon a hollow sleeve surrounding the driving shaft and supported in independent bearings, main electrical conductors and connecting devices whereby each of said dynamo electric machines may be connected with such mains to work either as a generator or motor.

5. The combination of a series of dynamo electric machines, with a main driving shaft and rotating parts for each dynamo electric machine supported on a hollow sleeve surrounding the main shaft and journaled in independent bearings, with clutch mechanisms whereby such rotating part or sleeve may be positively connected to the shaft at will.

6. The combination of a series of dynamo electric machines with a main driving shaft therefor, a rotating part for each machine supported on a hollow sleeve which surrounds the main shaft and is journaled on independent bearings and switches and connectors whereby any machine operating as a generator may be made to supply current to any other machine to operate it as a motor.

7. The combination of a main driving shaft with a dynamo electric machine having a moving part, a hollow sleeve longitudinally split and journaled in independent bearings, the main shaft passing through such hollow shaft and a rotating part for the dynamo, secured upon such hollow shaft, said moving part of such dynamo also divided or split into two or more pieces.

8. A magnetic clutch to connect the moving part of a dynamo electric machine with the driving shaft, which consists of an electro-magnet connected with either shaft or moving part, and a movable magnetized clutch block connected with the other part so as to slide thereon, but rotate therewith, and a reversing switch connected with the electro-magnet to change its polarity at will and attract or repel said clutch block.

BION J. ARNOLD.

Witnesses:
 FRANCES W. PARKER,
 WALTER J. GUNTHORP.